Feb. 8, 1955   R. W. BALTOSSER   2,701,659
LOCKING AND SEALING ARRANGEMENT
Filed June 26, 1951

Inventor
Robert W. Baltosser
by Mason, Kolehmainen, Rathburn & Wyss
Attys

United States Patent Office 2,701,659
Patented Feb. 8, 1955

2,701,659

LOCKING AND SEALING ARRANGEMENT

Robert W. Baltosser, Tulsa, Okla., assignor to Seismograph Service Corporation, Tulsa, Okla., a corporation of Delaware Application June 26, 1951, Serial No. 233,606

4 Claims. (Cl. 220—46)

The present invention relates to a locking and sealing arrangement for locking and sealing two parts together and is particularly well adapted for locking and sealing a cover with respect to an associated casing. Specifically, the present invention is a division of copending application Serial No. 233,605, filed June 26, 1951, and assigned to the same assignee as the present application.

The problem of locking two parts together in sealed relationship has application in almost every branch of industry and commerce. Moreover, the sealing and locking of a cover to an associated casing is one of the most common of the situations involving locking two parts together in sealed relationship. Perhaps the most common sealed container is the one employing a screw cap or similar device with an interposed sealing washer. Such arrangements for certain applications are expensive in that a number of threading operations are required and there is never any assurance that a good seal is obtained in every case. In the above mentioned copending application, of which this is a division, there is illustrated a seismometer which employs the present invention to seal a casing which is provided with a separable cover member. It would be desirable to provide a simple sealing arrangement which dispenses with closely machined or accurately fitted parts which is very simple with respect to performing the sealing operation and which is substantially fool-proof.

Accordingly, it is an object of the present invention to provide a new and improved sealing arrangement that not only provides a seal between a cover member and a casing or between two separable parts, but which simultaneously locks the two separable parts together.

It is another object of the present invention to provide an improved arrangement for locking two members together in sealed relationship which works equally well for an inside or an outside seal.

It is a further object of the present invention to provide an improved sealing and locking arrangement which can replace substantially any present arrangement where a screw connection and a sealing washer are employed.

Still another object of the present invention is to provide an improved sealing arrangement whereby a cover may be attached to a casing member in a sealed and locked manner merely by pressing the cover into position with respect to the casing.

Further objects and advantages of the present invention will become apparent as the following description proceeds and the features of novelty which characterize the invention will be pointed out with particularity in the claims annexed to and forming a part of this specification.

For a better understanding of the present invention, reference may be had to the accompanying drawing in which.

Figure 1:
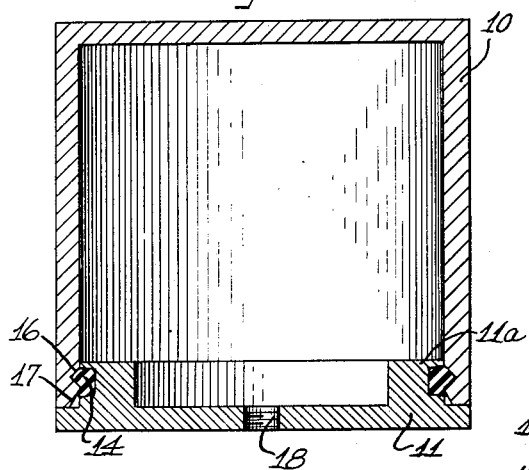
Fig. 1 is a vertical sectional view through a casing employing the sealing and locking arrangement of the present invention with the cover of the casing shown in sealed and locked relationship with respect to the casing.
Figure 2:
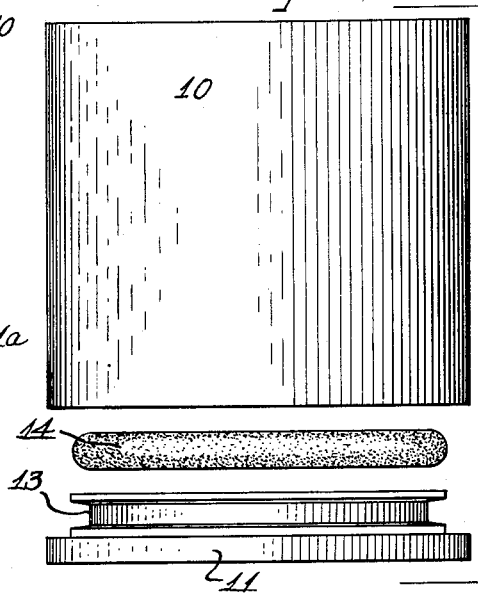
Fig. 2 is an exploded view of the respective elements of Fig. 1.
Figure 3:
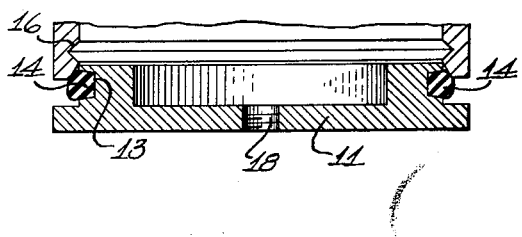
Figure 4:
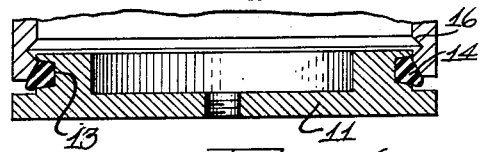
Figure 5:
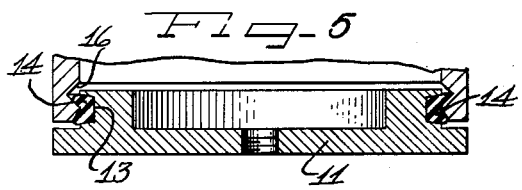
Figure 6:
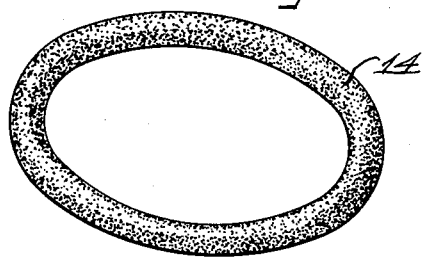

Figs. 3, 4 and 5 are sectional views similar to Fig. 1, of only a portion of Fig. 1 to show successive steps in carrying out the sealing operation of the present invention while the component parts are moved from the position shown in Fig. 2 of the drawing to the position shown in Fig. 1; and Fig. 6 is a perspective view of a toroidal sealing member which may be employed with the present invention.

Although the present invention is well adapted for relating two separable members of almost any nature in sealed relationship, it is particularly adaptable for relating a cover to a casing and essentially comprises a cover or closure means having an annular portion insertable into a casing with a recess defined around the outer surface of the insertable portion. Similarly, a recess is provided adjacent the open end of the casing on the inside thereof so that when the cover and casing are associated, the recesses will partially coincide to provide an annular chamber. A toroidal or similarly shaped sealing member of compressible material such as rubber or the like is adapted to be disposed in this chamber, but this toroidal member has a cross sectional area substantially greater even when compressed than that of the recess in the closure or cover member. The inside edge of the casing may be chamfered to accommodate the portion of the sealing member disposed outside the recess in the cover during the assembly operation and until there is partial coincidence of the two recesses so that the gasket disposed outside the recess in the closure means may move from the chamfered portion into the other recess.

Although the present invention is of general application, in the drawing it is specifically illustrated as applied to a cylindrical casing for locking a cover or closure means in sealed relationship with respect to said casing. As illustrated, a cylindrical casing generally indicated at 10, which may be formed of any suitable material, has one end thereof capable of being closed by a cover or closure member 11 which is illustrated as having an outer diameter substantially equal to that of the casing 10. However, the cover member 11 is provided with a portion arranged for telescopic relationship with the casing and specifically indicated as of reduced cross section generally designated at 11a which is capable of being inserted into the casing 10. This portion of annular cross section has a diameter substantially that of the internal diameter of the casing 10. In accordance with the present invention, there is defined in the portion 11a of the cover or closure member 11, an annular groove 13 which may have any suitable configuration for receiving therein a suitable sealing member generally designated at 14 which sealing member preferably comprises a toroidal member of compressible material such as rubber or any other similarly compressible material. The cross section of the sealing member 14 is preferably circular and the cross sectional area is substantially greater than the area of the recess 13 which means that if the sealing member 14 is inserted into the recess 13 in the manner indicated in Fig. 3 of the drawing, that a substantial portion thereof will extend outside the recess. Such sealing members are readily available on the market and are often referred to in the trade as "O-ring packings." They may be purchased as standard items in a wide variety of sizes as far as inner and outer diameters thereof are concerned so that for almost any application they are available as a standard item. It will be understood, moreover, that depending upon the particular use of such sealing members, particularly with respect to the atmosphere in which they are going to be used, the foreign materials with which they may come into contact and the temperatures and pressures that numerous different materials may be used. For example, any of the synthetic rubbers including the silicone rubbers may be used for such packing material.

In accordance with the present invention, the casing 10 is provided with an annular recess 16 on the inner wall thereof, which recess is located adjacent the open end of the casing with which the cover 11 is associated in a position so that when the cover has assumed its Fig. 1 position, that the recesses 13 and 16 are partially coincident to define an annular chamber. Actually, as is obvious from Fig. 1 of the drawings, complete coincidence is not attained, which results in a force tending to move cover 11 so the portion overlapping the end of casing 10 moves into tight fitting engagement with the cooperating end of casing 10. The recess 16 has been specifically designated as a triangular recess although it should be understood that it may have different shapes. The volume of the annular recess 16 should, however, be less than the volume of that portion of the toroidal sealing member 14 which extends outside the recess 13 in order that the sealing member 14 may be compressed to an extent to perform a satisfactory seal when the cover and casing are in the position shown in Fig. 1 of the drawing.

In order to permit the cover member 11 to be associated with the casing 10, when the sealing member 14 is disposed in the recess as indicated in Fig. 3 of the drawing, the inside edge of the casing 10 adjacent the end with which the cover 11 is associated is preferably chamfered as indicated at 17 in Fig. 1 of the drawing. It will be understood that any other shape of this edge may be provided although a beveled edge is most satisfactory since it tends to compress the gasket or sealing member 14 as pressure is applied to the closure member 11 in an upward direction as viewed in Fig. 3 of the drawing. Under certain conditions this beveled edge may be dispensed with in which case the toroidal sealing member would have to be initially compressed by means of a suitable tool or the like to a volume less than that of the recess 13 for assembly of the closure 11 with the casing 10.

With the arrangement described above, to close the casing 10 by means of the cover 11 and simultaneously to lock the cover to the casing 10 in sealed relationship with respect thereto, all that is necessary is to insert the sealing member 14 into the recess 13 in the manner shown in Fig. 3 of the drawing and then push the cover 11 into position relative to the casing 10. As pressure is applied, the chamfered portion 17 of the casing 10 will tend to squeeze the sealing member 14 and the portion thereof not capable of being retained in the volume defined by the recess 13 and the chamfered portion 17, will extend into the space between the cover and closure member as clearly indicated in Fig. 4 of the drawing. As the cover is moved farther into the casing 10, partial coincidence between the recess 13 and the recess 16 occurs whereupon the sealing member 14 may expand into the recess 16 as indicated in Fig. 5 of the drawing and when the cover is fully closed, the openings of the recesses 13 and 16 are in partial coincidence to define an annular chamber within which the sealing member 14 is wholly contained. Moreover, this sealing member 14 is compressed to an extent that an excellent seal is provided against any fluid pressure escaping either from outside the casing 10 into the casing or vice versa. More specifically and as clearly shown in Fig. 1, the centers of the two grooves 16 and 13 are out of registry, with the center of the groove 13 being located closer to the flange of the closure member 11 and the open end of the casing 10 than the center of the groove 16 when the cylindrical portion of the closure member 11 is fully telescoped within the casing 10 and the abutment surface of the closure member flange is in abutting engagement with the abutment surface, i. e., the open end surface, of the container 10. With this arrangement, the compressed toroidal sealing member 14 is subjected to static shearing forces through the cross section thereof, due to the non-registered centers of the grooves 13 and 16, so that the indicated abutment surfaces of the closure member flange and the container are biased into abutting engagement by the sealing member 14. Additionally, the cover 11 is locked to the casing 10.

In a particular embodiment constructed in accordance with the present invention, the casing 10 was able to withstand a pressure of 1200 pounds per square inch on the outside before any leakage from outside the container into the container occurred. In order to separate the cover 11 from the casing 10, a suitable pressure may be provided within the casing 10 as by applying the same through an opening 18 defined in the cover 11. In the particular embodiment constructed in accordance with the present invention, a pressure of 100 pounds per square inch is required to remove the cover 11 from its locked and sealed relationship with respect to casing 10.

In view of the detailed description included above, the operation of the present invention will be readily apparent to those skilled in the art, particularly with reference to Figs. 1 to 5 of the drawing. The sealing and locking relationship of the cover 11 with respect to the casing 10 can be accomplished merely by pushing the cover 11 into closed relationship with the casing 10. The cover and casing, moreover, can be manufactured in a simple and inexpensive manner and a generally sturdy and foolproof arrangement is provided.

While there has been illustrated and described a particular embodiment of the present invention, it is not desired that the invention be limited to the construction shown and described, for it will, of course, be obvious to those skilled in the art that changes and modifications may be made without departing from the invention in its broader aspects, and it is, therefore, aimed in the appended claims to cover all such changes and modifications as fall within the true spirit and scope of this invention.

What is claimed as new and desired to be secured by Letters Patent of the United States is:

1. In combination, a cylindrical casing provided with an end surface and having an internal circumferential groove adjacent said end surface, a closure member comprising a cylindrical portion telescopically receivable within the end of said casing and a flange adapted for seating engagement with said end surface, said cylindrical portion of said closure member being provided with an external circumferential groove having a center which is out of registry with and is closer to said flange than the center of said first-named groove when said cylindrical portion of said closure member is fully received within said casing and said flange is in seating engagement with said end surface, and a toroidal sealing member of compressible resilient material held under compression within said grooves to act as a sealing element and subjected to static shearing forces through the cross section thereof due to the non-registered centers of said grooves, thereby to bias said flange into seating engagement with said end surface.

2. In combination, a casing provided with an open ended cylindrical end portion having an abutment surface and an internal circumferential groove adjacent said abutment surface, a closure member comprising, a cylindrical portion telescopically receivable within the end portion of said casing and having an abutment surface adapted for abutting engagement with said first-named abutment surface to limit the extent of inward telescopic movement of said closure member, said cylindrical portion of said closure member being provided with an external circumferential groove having a center which is out of registry with and is closer to said open end of said casing than the center of said first-named groove when said cylindrical portion of said closure member is fully received within said casing and said abutment surfaces are in abutting engagement, and a toroidal sealing member of compressible resilient material held under compression within said grooves to act as a sealing element and subjected to static shearing forces through the cross section thereof due to the non-registered centers of said grooves, thereby to bias said abutment surfaces into abutting engagement.

3. The combination as claimed in claim 2, wherein said casing is provided with a chamfered edge surface between the open end and the internal groove of said casing to facilitate entry of said sealing member into the internal groove in said casing as said cylindrical portion of said closure member is telescoped into said casing with said sealing member disposed in the external groove in the cylindrical portion of said closure member.

4. The combination as claimed in claim 2, wherein the internal groove in said casing has lesser cross sectional area than the external groove in the cylindrical portion of said closure member, and wherein said casing is provided with a chamfered edge surface between the open end and the internal groove of said casing to facilitate entry of said sealing member into the internal groove in said casing as said cylindrical portion of said closure member is telescoped into said casing with said sealing member disposed in the external groove in the cylindrical portion of said closure member.

References Cited in the file of this patent

UNITED STATES PATENTS

| 723,645 | Brown | Mar. 24, 1903 |
| 769,866 | Jones | Sept. 13, 1904 |

FOREIGN PATENTS

| 11,953 | Great Britain | of 1907 |